United States Patent [19]

Voigt

[11] 4,048,129

[45] Sept. 13, 1977

[54] PREPARING THERMO-PLASTIC OR ELASTOMERIC MATERIALS FOR CROSS-LINKING OF GRAFTED SILANE

[75] Inventor: Hermann Uwe Voigt, Langenhagen, Germany

[73] Assignee: Kabel-und Metallwerke Gutehoffnungshutte Aktiengesellschaft, Hannover, Germany

[21] Appl. No.: 611,519

[22] Filed: Sept. 8, 1975

[30] Foreign Application Priority Data

Sept. 19, 1974 Germany .............................. 2444829

[51] Int. Cl.$^2$ ........................... C08F 8/12; C08F 8/42; C08F 8/00; C08F 8/06
[52] U.S. Cl. ................................. 260/23 H; 260/827; 260/878 R; 526/29; 526/48; 526/56; 526/57
[58] Field of Search ............... 526/29; 260/827, 23 H, 260/878 R

[56] References Cited

U.S. PATENT DOCUMENTS

| | | | |
|---|---|---|---|
| 3,503,943 | 3/1970 | Kresge et al. | 526/29 |
| 3,644,315 | 2/1972 | Gardner et al. | 526/29 |
| 3,646,155 | 2/1972 | Scott | 260/827 |
| 3,830,872 | 8/1974 | Schrage | 260/827 |

*Primary Examiner*—William F. Hamrock
*Attorney, Agent, or Firm*—Ralf H. Siegemund

[57] ABSTRACT

Siloxane cross-linking of polyethylene is carried out under in situ development of water by chemical reaction between an organic acid and a non-hygroscopic metal oxide producing a neutral salt and water. Specifically, an ester peroxide is used as additive to be mixed with silane and polyethylene. The ester peroxide decomposes during grafting in free acid, alcohol and graft initiators for obtaining the grafting of silane on polyethylene, and the acid reacts with zinc oxide or tin oxide, also used as additive, to obtain salt and water. Alternatively, stearic acid or adipic acid and zinc oxide or tin oxide are added to a polyethylene silane mixture to develop water and salt of the acid.

17 Claims, No Drawings

PREPARING THERMO-PLASTIC OR ELASTOMERIC MATERIALS FOR CROSS-LINKING OF GRAFTED SILANE

BACKGROUND OF THE INVENTION

The present invention relates to cross-linking of thermoplastic or elastomeric material in the presence of moisture and on the basis of grafting silane on the macro-molecules of the material. Preferably, but not exclusively, the invention relates to enveloping elongated stock, such as electrical cable, conductors, tubes, etc. by such materials, such as olefin-polymerizate or mixed olefin-polymerizates.

The German Pat. application No. 1,794,028 discloses grafting of organofunctional-trialcoxysilanes upon polyethylene chains to obtain subsequently cross-linking in the presence of moisture. The grafting is initiated under utilization of radical initiators, such as peroxides, e.g. dicumyl peroxide; di-terbutylperoxide; 1,3-bis (tert-.butylperoxi-isopropyl) benzene, etc. Also, azo-compounds such as azo-bisisobutyronitrile can be used as initiator. The grafting of the organo-silane upon the polyethylene molecules can be carried out during mechanical working, whereby free radicals are intermediately produced.

Siloxane cross-linking requires the presence of small amounts of water within the extruded and grafted material. This water is usually provided through diffusion in that e.g. following extrusion the material is placed into hot water. The duration of applying water depends on the thickness the material layer into which water molecules are to diffuse. Also, the water temperature is another factor determining the rate of diffusion. By way of example, a cable to be used for transmitting 1 kilovolts may be provided with a polyethylene insulation of about 1.3 mm thickness. When using boiling water, cross-linking is completed to a satisfactory degree, if the cable is left in the water for about 30 min. The duration of water application is 10 to 20 fold longer when the water temperature is only 80° C.

DESCRIPTION OF THE INVENTION

It is an object of the present invention to shorten the period needed for applying water to a graft polymer or the like for obtaining cross-linking.

It is another object of the present invention to improve the siloxane cross-linking process.

In accordance with the preferred embodiment of the present invention, it is suggested to add additives to an elastomeric or thermoplastic material which produce water by chemical reaction within the material to obtain cross-linking of the grafted silane. Specifically, an organic acid and a nonhygroscopic metal oxide are added to a mixture that includes the macromolecules of the basic material, e.g. polyethylene, the component to be grafted e.g. silane and other additives to obtain a neutral salt of that acid and water in situ to be available for condensation type cross-linking. The various components are intimately mixed at first, e.g. either in a dry mixer-agitator or in a mixing extruder, whereby specifically the metal salt particles are homogeneously distributed throughout the host material. The acid is preferably to be of the type that decomposes thermally so that the water develops pursuant to the thermally induced grafting, but only after the grafting has been completed.

It is preferred to shape the product immediately after grafting, if the thermally induced grafting sets also the reaction into motion, which produces the water, because cross-linking will commence as soon as water is available in the material.

The water as developed in situ is provided in stoichiometrically determinable quantities and can be metered very accurately accordingly. The invention obviates the need for placing the material into water to obtain the diffusion, because diffusion is no longer necessary; the water is developed in the material itself.

In accordance with the preferred form of practicing the invention, monobasic or multibasic fatty acids, such as stearic acid, adipic acid, etc. are added together with non-hygroscopic metal oxides, preferably tin or zinc oxides. The reaction between the acid and the oxide produces water and a residue compound which is indifferent as far as the plastic material generally and cross-linking specifically is concerned. The chemically indifferent residue is e.g. a metal salt which does not interfere with the cross-linking nor does it have any detrimental influence on the salient properties of the extrudate.

The water as developed by chemical reaction in the material may initiate and carry out the cross-linking under the promoting influence of one or more catalysts. The invention has the specific advantage here that the water is quite evenly distributed and homogeneously developed in the material, so that cross-linking can occur everywhere. A homogenic distribution of the cross-links is of specific advantage for cable with regard to its mechanical and electrical properties. Diffusion of water cannot possibly produce a similar degree of homogeneity. It has to be observed here that water diffuses preferably through amorphous, non-crystalline regions of the polyethylene so that the density of cross-links will be much lower in the crystaline regions.

It is of particular advantage if one uses a peroxide as additives which forms an acid upon thermal decomposition. For example, ester-peroxide can be used together with tin or zinc oxide. Specifically, tert.butylperoxy-isonanoate (tert. butyl per -3,5,5-tri-methylhexanoate) is used with advantage, but other ester peroxides can also be used. It should be noted that undesired premature peroxide cross-linking of the polyethylene through C—C bridges will occur to a minor extent only when these peroxides are used. On the other hand, they furnish a long chain of carbonic acid, such as isononanoic acid or 3,5,5-tri-methyl-hexanoic acid in addition to tert. butanol, when decomposing thermally. The reaction is as follows:

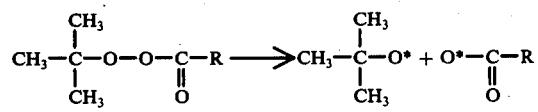

wherein R represents a 3,5,5-tri-methyl-hexyl radical or a isononanyl radical and the astrix (*) denotes the active sites available for radical reaction.

The tert. butoxy-radical and the acyl radical induce sites for radicals on the polyethylene macromolecules and initiate grafting, while these locations themselves are deactivated by transfer of hydrogen. For each molecule of peroxide entering the reaction one obtains one molecule of tert. butanol and one molecule of isononanoic acid.

Depending on the reactivity of the used organosilane, grafting is mostly a rather quickly running process. This is particularly the case when the vinyl or allyl groups remain as organic groups at the silicon atoms. The speed of grafting is then always determined by the speed of thermal decomposition of the peroxide grafting as completed prior to shaping the plastic by the extrusion die.

As stated, non-hygroscopic metal oxides, such as tin oxide or zinc-oxide are preferably to be used, and these oxides react with the acid as resulting prior to the thermal decomposition of the peroxide. Particularly, the high temperature needed and used for grafting causes that acid to react with the metal oxide as follows (using SnO as example):

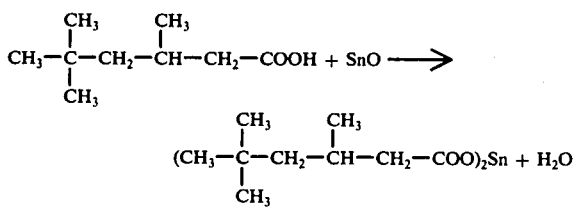

Thus, the reaction product is water and the Sn salt of the isononanoic acid. The water developed in that fashion depends on the amount of peroxide used as additive. The usual peroxide amount ranges from 0.2 to 0.3% (by weight) with reference to the base polymer (polyethylene), and that amount will yield about 0.01% by weight water. The base material contains already some water, about 0.01 to 0.015%, and the added amount of 0.01% as resulting from the afore-described reaction suffices for the cross-linking reaction. This is particularly true because the H₂O content used for hydrolysis of the alcoxy group in the silanol condensation reaction is to some extent restored on cross-linking and can again participate in the relation in accordance with the following scheme.

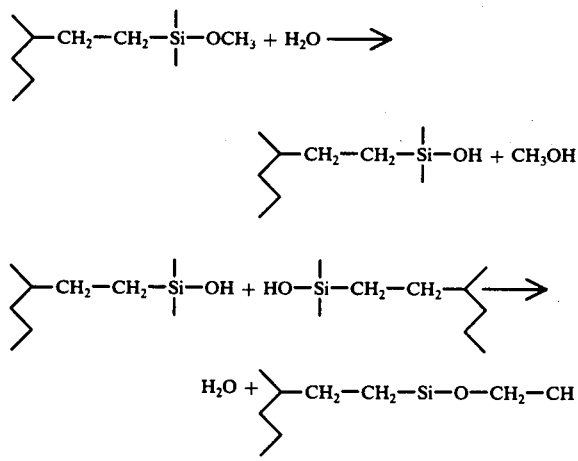

In accordance with the preferred form of practicing the invention one uses about 0.5 to 2 parts metal oxide per 100 parts polyethylene as base material. The combination use thereof with the peroxides forming acids upon thermal decomposition adds the advantage that further catalysts are not needed. The salt formed upon the reaction of the isononanoic acid and the tin oxide has a catalytic effect on the alcoxyhydrolysis as well as on the condensation reaction leading to cross-linking. Thus, one does not need dibutyl-tin - dilaurate as commonly used as catalyst for silanol condensation. In other words, the (still needed) catalyst for cross-linking is developed in the material itself by chemical reaction following the grafting. The inventive process, therefore, combines the internal formation of water with induction of active sites on the polyethylene macromolecules for grafting, whereby additionally the catalyst for cross-linking is produced as a by-product.

The metal oxides may, for example, be added to the granular or powdery polyethylene, when in a fluidized state and while being agitated. For example, the powdery polyethylene is charged in a fast rotating dry mixer. The silane, the peroxide, and possibly, activators and ageing protectors (anti-oxidants) are added as solution. That solution may also contain the metal oxide in suspension. The agitation and frictional heating of the powder produces diffusion of the liquidous additives, but the oxide particles are squeezed into the surface of the softened polyethylene powder particles. The temperature to be maintained here, either through friction or external heating or both is about 80° to 95° C. With or without such prior agitation, a grafting extruder receiving the polyethylene plus additive mixture will ensure that the metal is homogenously distributed in the extruded polyethylene, in the worm and barrel region of the extruder.

The following examples demonstrate particular use of the invention:

EXAMPLE 1

The following mixture was used:

| | parts (by weight) |
|---|---|
| Polyethylene lupolen 1810 H | 100 |
| Peroxide (tert. butyl-per-isonanoate) | 0.23 |
| Vinyl-trimethoxysilane | 2.0 |
| Activator OC | 0.18 |
| Anox HB | 0.5 |
| ZnO | 0.5 | wherein Anox HB is a product available under that name and consisting of 2,2,4 trimethyl-dihydro-quinoline and the activator is triallylcyanurate.

15 kilograms polyethylene were mixed in a dry mixer with the corresponding quantity of vinyltrimethoxysilane and the latter liquid contains all other components needed for cross-linking and it contained also the ZnO in suspension. The temperature was raised rather rapidly to 95° C as the mixer assumed a stirring speed of about 1700 RPM. The liquid additives diffused into the powdery polyethylene within a few minutes and the metal oxide was mechanically integrated in the powder.

The mixture was charged in an extruder of 45 mm barrel length and with an L/D ratio of 20 and the material was extruded at an exit temperature of 220° C. During the extrusion, the following reactions occurred whereby each follower reaction has a specific purpose and task.

The primary reaction was the decompositioning of the peroxide in two radicals. The first follower reaction caused formation of a radical to the polyethylene macromolecules under development of free acid and alcohol. The second follower reaction was the grafting of the organosilane upon the macromolecules. The third follower reaction was the reaction of the just formed acid with the metal oxide under formation of water and of a metal salt to serve as catalyst. The forth follower reaction was the hydrolysis of the alcoxy group at the grafted silane followed by condensation and cross-linking by means of the catalyst as formed in the third follower reaction, while water is restored to serve in the hydrolysis.

The following example demonstrates use of the invention without including the peroxide in the reaction.

EXAMPLE 2

| | |
|---|---|
| Polyethylene Lupolen 1800 M | 100 |
| Tert. butyl-peroxy-isonanoate | 0.2 |
| Perkadox 14 | 0.01 |
| Vinyl-trimethoxysilane | 2.0 |
| ZnO | 0.5 |
| Stearic acid | 0.5 |
| Activator OC | 0.06 |
| Anox HB | 0.5 |

Mixing and preparation of the mixture is carried out as in example 1. Water is developed when the stearic acid reacts with the ZnO.

It can thus be seen that siloxane cross-linking is considerably improved by the invention, because the extruded product does not have to be placed in hot water, and in cases one does not even need a separate catalyst. If one uses a particular peroxide, namely an ester-peroxide, i.e. a perester, such as the tert. butyl-per-3,5,5-trimethylhexanoate, one obtains the rather complex sequence of reaction as was outlined above.

The invention is not limited to the embodiments described above, but all changes and modifications thereof and including any disclosure in patent application Ser. No. 557,108 filed Mar. 10, 1975, but not constituting departures from the spirit and scope of the invention are intended to be included. It should be noted that the water-producing reaction is quite compatible with prior grafting of an anti-oxidant as described also in my co-pending application (D-5805). It is pointed out, however, that extruding, for example, a sheath around a conductor for purposes of cable making will result in a unique product as per the present invention in that water developed in situ in the extruder and as part of the thermal processing of the extruded polyethylene with grafted silane causes quite uniformly cross-linking so that a thermo-setting plastic envelope or sheath is produced around the conductor, which has configuration and shape as extruded. The product is, therefore, different from sheathed conductors, where the water was caused to diffuse into the sheath from the outside.

I claim:

1. In a method cross-linking thermo-plastic or elastomeric material in the presence of moisture, the material being prepared by grafting a silane compound, the improvement comprising the step of adding to and mixing with the material, compounds which form water by chemical reaction, the adding being carried out prior to grafting to obtain cross-linking of grafted silane through the water as formed in situ by the reaction and throughout the material.

2. In a method as in claim 1, wherein the formation of water is carried out by heating the material.

3. In a method as in claim 1, wherein the formation of water occurs during thermally induced grafting.

4. In a method as in claim 1, wherein the compounds added are mono-basic or multi-basic fatty acid and non-hygroscopic metal oxides.

5. In a method as in claim 4, wherein the acid is stearic or adipic acid, the metal oxide being tin or zinc oxide.

6. In a method as in claim 1, wherein the compounds are a peroxide forming an organic acid upon thermal decompositioning and a non-hygroscopic metal oxide combining with the acid to a neutral salt and water.

7. In a method as in claim 6, the peroxide being an ester-peroxide.

8. Method as in claim 7, using tert.butyl-per-3,5,5 trimethylhexanoate.

9. Method as in claim 4, wherein the metal oxide is added at not more than 10 preferably 0.5 to 2 parts by weight per 100 parts of the material.

10. Method as in claim 1, wherein the compounds include metal oxide suspended in a solution that includes silane and mixed with the material.

11. In a method as in claim 10, wherein the thermoplastic or elastomeric material is provided in granular or powdery consistency, and the silane compound as well as said material compounds being added and agitated to obtain diffusion of the compounds into the granular or powder particles.

12. In a method as in claim 1, wherein the material is extruded following the adding of the silane compound and of said material commpounds, the chemical reaction occurring during grafting.

13. In a method as in claim 6, said metal oxide being tin oxide or zinc oxide.

14. In a method as in claim 1, wherein the material is polyethylene type polymer, the compounds are (i) a peroxide forming an organic acid upon thermal decompositioning preceding grafting proper, and (ii) tin or zinc oxide.

15. In a method as in claim 14, using about 0.5 to 2 parts metal oxide per 100 parts polymer.

16. In a method as in claim 14, using tert.-butyl-per-3,5,5 trimethylhexanoate.

17. In a method as in claim 14, wherein the polymer is provided in granular or powdery consistency, the silane compound and the tin oxide or zinc oxide being added to the granular or powdery material, and agitated therewith to obtain diffusion into the granular or powder particles; and extruding the resulting mixture.

* * * * *